United States Patent
Roden et al.

(10) Patent No.: US 7,841,042 B2
(45) Date of Patent: Nov. 30, 2010

(54) TRUCK MOUNTED HEAT EXCHANGE DEVICE

(75) Inventors: Michael James Roden, Prescott, AZ (US); Ronald Wayne Williams, Prescott, AZ (US)

(73) Assignee: Karcher North America, Inc., Englewood, CO (US)

( * ) Notice: Subject to any disclaimer, the term of this patent is extended or adjusted under 35 U.S.C. 154(b) by 1146 days.

(21) Appl. No.: 11/463,968

(22) Filed: Aug. 11, 2006

(65) Prior Publication Data

US 2008/0035304 A1 Feb. 14, 2008

(51) Int. Cl.
*A47L 7/04* (2006.01)

(52) U.S. Cl. .......................... 15/320; 15/319

(58) Field of Classification Search ........... 15/319–321, 15/339, 340.1; 165/101, 103, 41, 51, 52, 165/292
See application file for complete search history.

(56) References Cited

U.S. PATENT DOCUMENTS

| | | | |
|---|---|---|---|
| 4,109,340 A | 8/1978 | Bates | |
| 4,284,127 A | 8/1981 | Collier et al. | |
| 4,443,909 A | 4/1984 | Cameron | |
| 4,600,144 A | 7/1986 | Zelczer | |
| 4,940,082 A * | 7/1990 | Roden | 15/321 |
| 4,949,424 A | 8/1990 | Shero | |
| 4,991,254 A | 2/1991 | Roden et al. | |
| 4,993,367 A * | 2/1991 | Kehrer | 122/7 R |
| 5,134,945 A | 8/1992 | Reimlinger et al. | |
| 5,469,598 A | 11/1995 | Sales | |
| 5,606,768 A | 3/1997 | Sundberg | |
| 6,141,961 A * | 11/2000 | Rinckel | 60/288 |
| 6,182,328 B1 | 2/2001 | Roden | |
| 6,675,437 B1 | 1/2004 | York | |
| 6,955,213 B2 * | 10/2005 | Stonehouse et al. | 165/103 |
| 7,032,577 B2 | 4/2006 | Rosin et al. | |
| 7,036,565 B2 * | 5/2006 | Brost et al. | 165/103 |
| 7,610,949 B2 * | 11/2009 | Palanchon | 165/103 |
| 2003/0111211 A1 * | 6/2003 | Stonehouse et al. | 165/103 |
| 2003/0229963 A1 | 12/2003 | Broehl et al. | |
| 2004/0134649 A1 | 7/2004 | Richardson et al. | |
| 2005/0056402 A1 * | 3/2005 | Han et al. | 165/103 |
| 2005/0210620 A1 | 9/2005 | VanOrden et al. | |
| 2006/0032613 A1 * | 2/2006 | Brost et al. | 165/103 |

* cited by examiner

*Primary Examiner*—Dung Van Nguyen
(74) *Attorney, Agent, or Firm*—Sheridan Ross P.C.

(57) ABSTRACT

A device for heating a fluid for use in carpet cleaning is provided. Specifically, the device routes a source of exhaust toward and/or around a heat exchange chamber to heat a fluid in a controlled manner. The fluid may be heated to a maximum amount when the full amount of exhaust is flowed through the heat exchange chamber. The fluid may not be substantially heated when the exhaust is flowed around the heat exchange chamber through an exhaust bypass. The fluid can also be heated to an intermediate amount by flowing some, but not all of the exhaust through the heat exchange chamber and the rest of the exhaust through the bypass.

18 Claims, 3 Drawing Sheets

TRUCK MOUNTED HEAT EXCHANGE DEVICE

FIELD OF INVENTION

The present invention is directed toward cleaning equipment. More specifically, the present invention transfers heat given off by a combustion engine to one or more cleaning fluids such that the cleaning fluids are heated prior to application to a surface to be cleaned.

BACKGROUND OF THE INVENTION

There are two categories of truck-mounted carpet cleaning systems. The first category of truck-mounted carpet cleaning systems is direct drive systems, or van-powered systems. These direct drive systems are powered by the engine of the vehicle on which they are installed. The second category of truck-mounted cleaning systems is a slide-in system. Slide-in systems are self-contained units that are powered by their own engines.

Truck-mounted carpet cleaning systems typically employ powerful vacuums, combined with hot water and chemicals to achieve their cleaning results. The hot water serves two purposes during carpet cleaning. First, the hot water helps activate certain types of cleaning chemicals such that they are more effective in cleaning a carpeted surface. Second, the hot water facilitates quicker drying time than does colder water. The hot water is typically generated by passing water through one or more heat exchange devices. Heat can be extracted from the vehicle's engine coolant, the system's engine exhaust, or the blower exhaust.

Typical systems employ multiple heat exchange devices to heat various fluids. For example, one heat exchange device utilizes exhaust from a blower of a vehicle. The temperature of exhaust generated by the blower is generally in the range between about 250 degrees and about 300 degrees Fahrenheit. Employing blower exhaust helps preheat the water to an intermediate temperature, which is less than ideal for cleaning.

The main exchanger utilizes exhaust from the system's engine or the vehicle's engine. This exhaust is much hotter than exhaust collected from the blower, typically in excess of 1000 degrees Fahrenheit. The main exchanger heats the water to the ideal temperature for cleaning, which is between about 230-250 degrees Fahrenheit. However, since the engine exhaust is so hot, it is possible to overheat the water in the exchanger. In order to prevent the water from overheating, some systems are equipped with a heat diverter, which routes all of the high temperature exhaust gases away from the heat exchange device. The systems may be equipped with a bypass system to move heated water out of the system to either a recovery tank or to a fresh water supply tank if the water reaches a predetermined temperature where cooler water can then be drawn into the system.

These described technologies require either diverting an entire source of exhaust (i.e., all of the high temperature exhaust gases) or diverting and controlling a number of fluid flows to maintain a suitable water temperature. The downside of these solutions is that they require a complete diversion system that is separate from the heat exchange device along with a number of complicated valves and sensors. Also, some heat exchange devices do not have multiple exhaust sources (i.e., a source of somewhat hot exhaust and a source of very hot exhaust). For these types of systems it is very difficult to accurately control the temperature of the water or other fluids by diverting the sole supply of exhaust.

SUMMARY

To address these and other needs of the prior art, a truck-mounted heat exchange device that can differentially divert a single source of exhaust is provided herein. More specifically, in one embodiment, the heat exchange device may include a heat exchange chamber having a fluid inlet, a fluid outlet, and an exhaust passage. There may also be an exhaust bypass provided within the heat exchange device. The exhaust is differentially diverted between the exhaust passage and the exhaust bypass. Heat is transferred from the exhaust that passes through the exhaust passage to fluid flowing through the heat exchange chamber. Conversely, substantially no heat is transferred from the exhaust to the fluid when the exhaust flows through the exhaust bypass. Thus, as can be appreciated by one of skill in the art, a controlled heating of the fluid can be achieved by controlling the ratio of exhaust passing through the exhaust passage and exhaust bypass. Controlling the movement of the exhaust within the heat exchange device is more efficient than controlling the fluid flows within the heat exchange device because the weight and frictional forces associated with exhaust are much less than fluids.

In accordance with one embodiment, the heat exchange device may include a number of different heat exchange chambers each of which may have a different fluid flowing therein. Each of the chambers can be used to heat the different fluids to a different temperature. For example, fluid flowing through a first chamber may have a relatively large amount of exhaust passing through the exhaust passage associated with the first chamber. Thus, a relatively large amount of heat is transferred from the exhaust to the first fluid. A second fluid flowing through a second chamber may have a lesser amount of exhaust passing through the exhaust passage associated with the second chamber. This results in a slightly lower heat exchange than is realized in the first chamber. Likewise, a third fluid flowing through a third chamber may have no exhaust passing through the exhaust passage associated with the third chamber. Fluid flowing through the third chamber therefore receives little to no heat from the exhaust.

Each of the differentially heated fluids may then be provided to a carpet-treating device separately. In this case, each fluid may serve a different purpose in treating the carpet. For example, the first fluid may be steam that is used to clean the carpet whereas the second fluid may be a cleaning solution that requires some amount of heating to become activated.

In an alternative embodiment, the differentially heated fluid may be combined into a single fluid supply for the carpet-treating device. In this case, each of the fluids may be heated to different degrees to control the final temperature of the combined fluid. The differentially heated fluids may be the same type of fluid (e.g., water) that is simply heated to different amounts. Alternatively, the differentially heated fluids may be different fluids (e.g., water, cleaning solution, etc.) heated to different amounts.

In accordance with one embodiment, the exhaust used to heat the fluid is a combination of a vacuum pump exhaust and exhaust collected from an internal combustion engine. The vacuum pump exhaust is mixed with the internal combustion engine exhaust in a prechamber before the mixed exhaust is differentially diverted to the exhaust passage and/or the exhaust bypass. By premixing the two sources of exhaust an exhaust of relatively high temperature is created.

These and other advantages will be apparent from the disclosure of the invention(s) contained herein. The above-described embodiments and configurations are neither complete nor exhaustive. As will be appreciated, other embodi-

DETAILED DESCRIPTION

Figure 1:
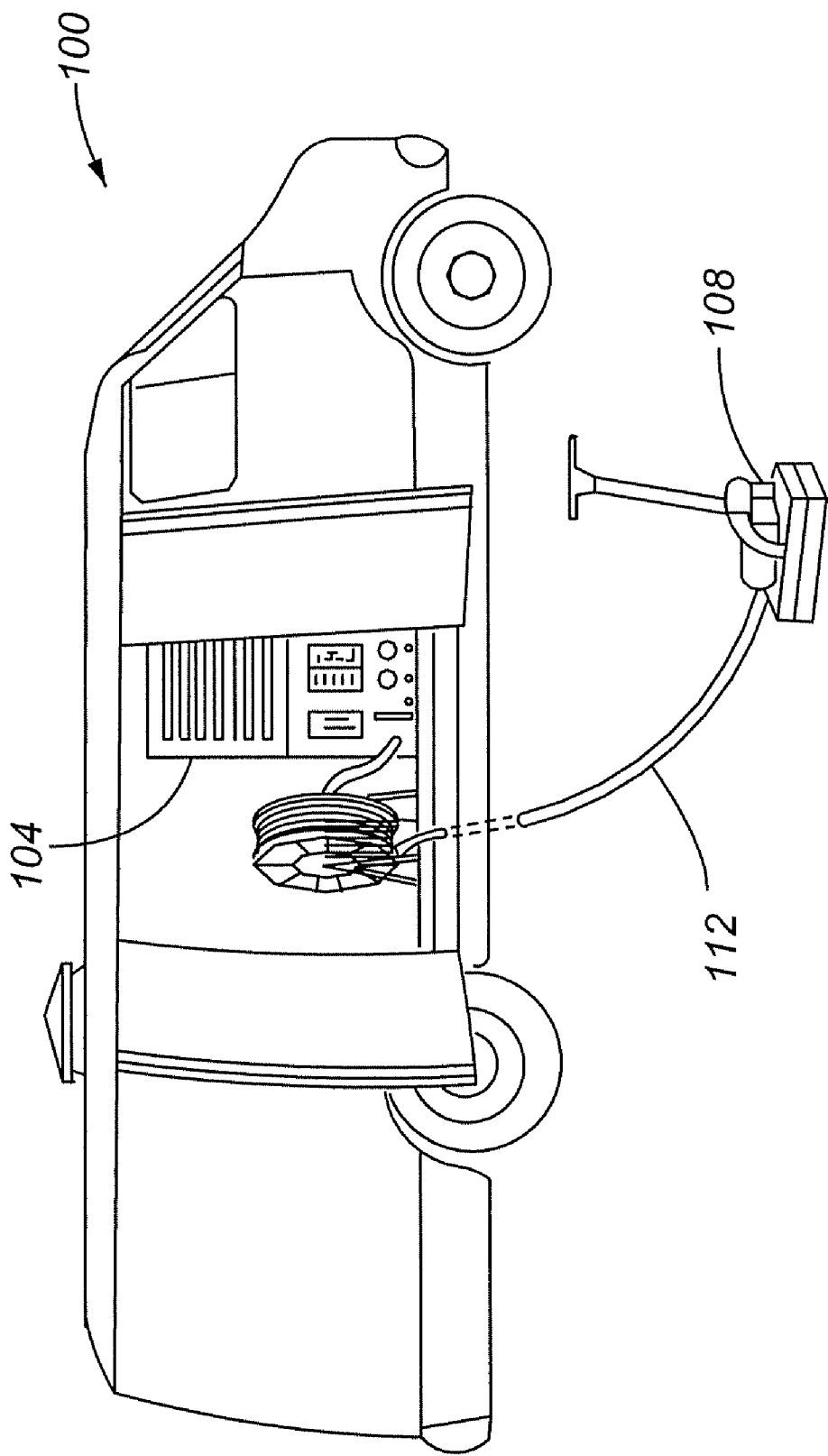
FIG. 1 depicts a truck-mounted cleaning system in accordance with embodiments of the present invention.

Referring initially to FIG. 1 a cleaning system 100 will be described in accordance with embodiments of the present invention. The cleaning system 100 generally comprises a heating machine 104, a cleaner 108, and a hose 112. Fluid is provided to the heating machine 104 at a first temperature. After passing through the heating machine 104, the fluid has a second temperature, which is generally higher than the original temperature of the fluid. Once heated, the fluid is supplied to the cleaner 108 via the hose 112.

The cleaner 108 may be any suitable type of surface treating device. In one embodiment, the cleaner 108 is operable to treat a floor surface. More particularly, the cleaner 108 may be designed to treat carpeted surfaces. The cleaner 108 may be equipped to treat any number of surfaces other than a carpeted floor. For example, the cleaner 108 may be designed to clean hard floor surfaces such as tile, hardwood floors, concrete, marble, etc. Examples of other surfaces that may be cleaned by the cleaner 108 include, without limitation, drapes, upholstery, walls, rugs, and the like. The cleaner 108 may include any number of spray nozzles or other types of fluid applicators that can supply fluid to a surface to be cleaned. The cleaner 108 may also include one or more vacuum hoses that can subsequently remove portions of the applied fluid along with any debris suspended within the fluid.

The heating machine 104 and hose 112 are generally associated with a mobile vehicle such as a van, truck, car, SUV, or the like. This provides for a mobile cleaning device that can have fluids heated prior to application. In accordance with embodiments of the present invention, exhaust from the vehicle and possibly from a motor running the cleaner 108 is used to heat the fluid in the heating machine 104. Heat from the exhaust is transferred to the fluid in the heating machine 104 as will be described in further detail below.

Figure 2:
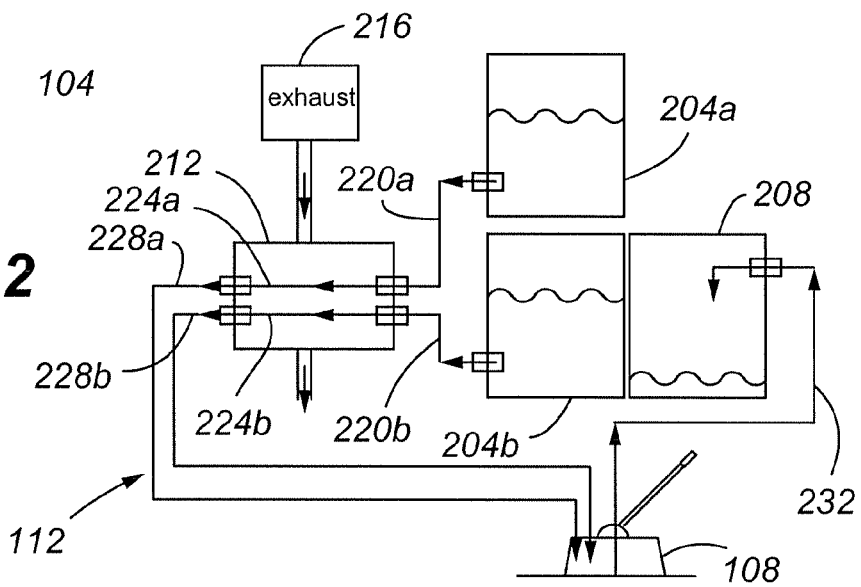
FIG. 2 is a block diagram depicting fluid flow through the cleaning system in accordance with at least one embodiment of the present invention.

With reference to FIG. 2, the flow of fluids through the cleaning system 100 will be described in accordance with at least some embodiment of the present invention. As noted above, the fluid is generally provided to the heating machine 104 for subsequent heating. The heating machine generally comprises one or more fluid supply tanks 204a, 204b, a fluid recovery tank 208, and a heat exchange device 212. An exhaust source 216 provides heated exhaust to the heat exchange device 212. The fluids from the storage tanks 204a, 204b are transferred to the heat exchange device 212 via fluid supply lines 220a, 220b respectively. Once in the heat exchange device 212, each fluid is allowed to flow through a heat exchange chamber 224a, 224b respectively.

Heat is transferred from the exhaust to the fluid in the heat exchange chamber 224a, 224b. Generally, the fluid is provided to the supply tanks 204a, 204b at temperatures ranging between about 60 degrees and about 80 degrees Fahrenheit. The fluid transfers to the heat exchange device 212 at about these same temperatures. However, once the fluid is in the heat exchange chamber 224, heat is transferred from the exhaust 216 to the fluid. In one embodiment, each fluid is subjected to about the same amount of exhaust for about the same amount of time and thus each fluid exits the heat exchange device 212 at about the same elevated temperature. In an alternative embodiment, each fluid is subjected to different amounts of exhaust and therefore exit the heat exchange device 212 at different temperatures. As the exhaust is passed through the heat exchange device 212, the exhaust temperature decreases due to the thermal transfer of heat from the exhaust to the fluid.

The fluid exits the heat exchange chamber 224a, 224b via the exchanger fluid outlet 228a, 228b. The fluid outlets 228a, 228b may include any known type of hose fitting that allows the hose 112 to interface with the heat exchange device 212, for example threaded fittings, compression fittings, or any type of quick coupling. The heated fluid is provided to the cleaner 108 via the hose 112.

The depicted hose 112 includes a number parallel flow paths that separate the heated fluids. One flow path may be dedicated to a first type of fluid, for example water, whereas another flow path may be dedicated to another type of cleaning fluid or the like. Additionally, one flow path may carry water in a liquid state, whereas the other flow path may carry steam. Alternatively, the fluid may be combined either by the hose 112 or the heating device 212 and supplied to the cleaner 108 via a single flow path. Obviously, and as a skilled artisan would appreciate, additional hoses could be used with the invention to transport additional heated fluids to the cleaner 108.

The cleaner 108 applies one or more fluids to the surface to be cleaned. Fluids are either applied together or separately depending upon the application. Thereafter, the fluid, along with any debris collected by the fluid, is recovered in known fashions by the cleaner 108 and supplied to the recovery tank 208 via the fluid recovery line 232.

Fluid is moved through the system with the aid of a pressure pump capable of creating a pressure differential between two points. However, fluid may also be flowed through certain portions of the system through gravity feeds or the like. In a preferred embodiment, fluid is supplied from the tanks 204 to the heat exchange device 212 under pressurized conditions. Additionally, the fluid is supplied from the heat exchange device 212 to the cleaner under pressurized conditions. The liquid is recovered from the surface using suction created by a vacuum motor.

In accordance with at least one embodiment, sensors may be included as a part of the heating machine 104. Some sensors may be used to monitor fluid levels in the tanks 204, 208. Once the level of fluid reaches a certain point, then events may be triggered that inform a user that fluid should be added or removed from a tank. Additionally, sensors may be used to monitor fluid temperatures, exhaust flows, and fluid flows during cleaning operations. If fluid temperature exceeds a particular threshold, for example, in the outlet 228, then the flow of exhaust through the exchange chamber 224 could be reduced to achieve desired fluid temperature regulation.

As can be appreciated by one of skill in the art, although a system is described that heats two fluids differentially, a greater or lesser number of fluids can be supplied to the heat exchange device 212. Moreover, fluid flows may be split from a single storage tank prior to entering the heat exchange device 212, such that the same fluid is heated by two different amounts in the heat exchange device 212. The separated fluids may then be combined upon exit from the heat exchange device 212.

Figure 3:
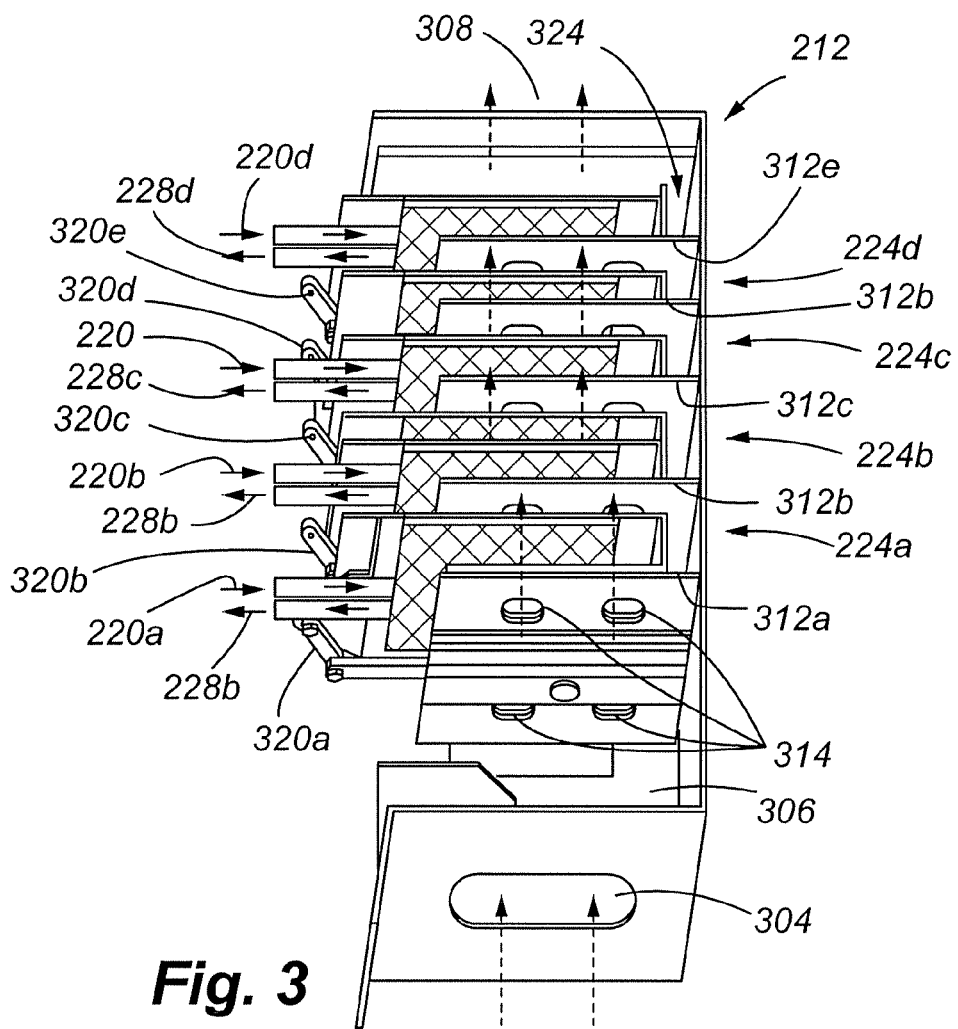
FIG. 3 is a perspective view of a heat exchange device in accordance with embodiments of the present invention.

Referring now to FIG. 3, an exemplary heat exchange device 212 will be described in accordance with at least some embodiments of the present invention. The heat exchange device 212 generally comprises an exhaust inlet 304, a prechamber 306 for mixing multiple sources of exhaust, an exhaust outlet 308, one or more exhaust flow control doors 312*a-e* each having exhaust inlets 314, a control interface 320*a-e*, and a heat bypass 324.

The exhaust generally flows through the heat exchange device 212 in a direction depicted by the arrows. The heat exchange chambers 224*a-d* are aligned substantially transverse to the direction of travel of the exhaust such that a maximum surface area of the chamber 224 is exposed to the exhaust flow. The fluid enters the heat exchange chamber 224 at one of the inlets 220*a-d*. The fluid then passes through the heat exchange chamber 224, which may include a length of conduit that traverses back and forth within the chamber 224, thus exposing the fluid to the exhaust for an extended period of time. This helps increase heat transfer from the exhaust to the fluid. The fluid then exits the chamber 224 via the exchanger fluid outlet 228*a-d*.

Each of the chamber 224*a-d* are separated by the exhaust flow control doors 312*a-e*. The first exhaust flow control door 312*a* controls the amount of exhaust allowed into the first chamber 224*a*. Likewise, the second exhaust flow control door 312*b* controls the exhaust flow allowed through the exhaust passage of the second chamber 224*b*. Accordingly, by the manipulation of a control door 312 one can control the amount of exhaust passed through the exhaust passageway of each chamber 224, thereby controlling the amount of heat transferred to the fluid in the chamber 224.

Each control door 312 is equipped with exhaust inlets 314 that, when aligned properly, allow exhaust to pass through the corresponding chamber 224. In an alternative alignment, the control doors 312 inhibit exhaust from flowing through the corresponding chamber 224. The control interface 320*a-e* is used to control the position of the control doors 312. Each control door 312*a-d* is coupled to a corresponding control interface 320 via a series of mechanical devices. The control interface 320 may include any known mechanical interfaces including, without limitation, shafts, gears, pulleys, and the like. A user of the heat exchange device 212 can manipulate the control interface 320 to adjust the position of the control door 312. In one embodiment, the user interacts with the control interface 320 physically to perform manual adjustments. Alternatively, a user may interact with the control interface 320 through an electronic interface on an electromechanical interface. Commands sent from the electronic interface may operate servomotors or the like that adjust the position of the control interface 320. Further in the alternative, sensor may be coupled to the servomotors controlling the control interface 320 such that a control loop is created and the flow of exhaust is adjusted automatically. As can be appreciated by one of skill in the art, a single control interface 320 may be provided for each control door 312 rather than supplying individual control interfaces 320 for all control doors 312.

The control doors 312 direct the exhaust through the corresponding chamber 224 and/or through the exhaust bypass 324. When exhaust flows through the bypass 324, little to no heat is transferred from the exhaust to the fluid. The bypass 324 is aligned along the same direction of travel as the exhaust flow and therefore has it longitudinal axis arranged transverse to the chambers 224. If one control door 312 is positioned to stop the exhaust from flowing over the corresponding chamber 224, then the exhaust is forced through the alternative path of the bypass 324. After the exhaust passes through the length of the heat exchange device 212 (via the chamber 224 passageways and/or via the bypass 324), the exhaust exits the heat exchange device 212 out the exhaust outlet 308. The outlet exhaust may be reintroduced to the exhaust inlet 304 or may be expelled out of a tailpipe or the like.

Figure 4:
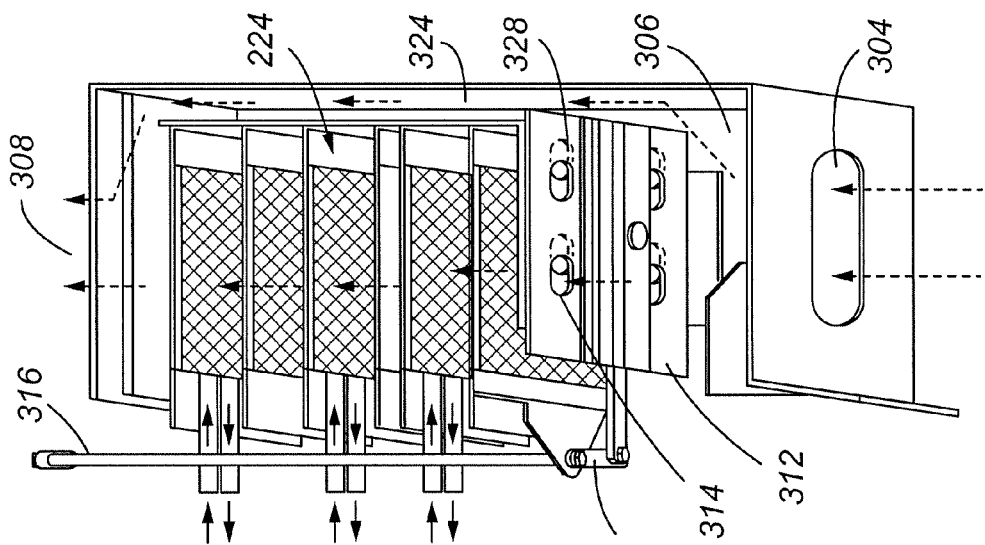
FIG. 4 is a perspective view of a heat exchange device in a first configuration in accordance with embodiments of the present invention.

Referring now to FIG. 4, a heat exchange device 212 in a full heat transfer configuration will be described in accordance with at least some embodiments of the present invention. For ease of discussion, a single control door 312 is shown in the depicted embodiment although it should be noted that additional doors 312 may be provided for each exchange chamber 224. In the full heat transfer configuration, the control door exhaust inlets 314 are aligned with exhaust inlets of the exchange chamber 328. This alignment allows substantially all of the exhaust (i.e., all exhaust with the exception of any exhaust that leaks out of the heat exchange device 212) to flow through the passageway of the heat exchange chamber 224. With the full amount of exhaust passing through the heat exchange chamber 224, a maximum amount of heat transfer to the fluid is realized. This particular configuration may be used for the creation of steam or super heated water.

As can also be seen in FIG. 4, a control arm 316 may be coupled to the control interface 320. The control arm 316 may be engaged by the user of the device to position the door 312 in the full heat transfer configuration. The control arm 316 may be inserted into the control interface 320 such that when the control arm 316 is rotated or moved away from the exchange chambers 224, the control interface 320 pushes the control door 312 across the prechamber 306 to substantially block exhaust from flowing through the bypass 324. Thus, the only path for the exhaust to flow is through the heat exchange chambers 224. The use of a control door 312 rather than a valve or the like minimizes or even eliminates the amount of back pressure than can be created as the result of exhaust buildup in the prechamber 306. Instead, exhaust is always flowing through the heat exchange device 212, whether it is through the passageway of the heat exchange chamber 224 or through the bypass 324.

Figure 5:
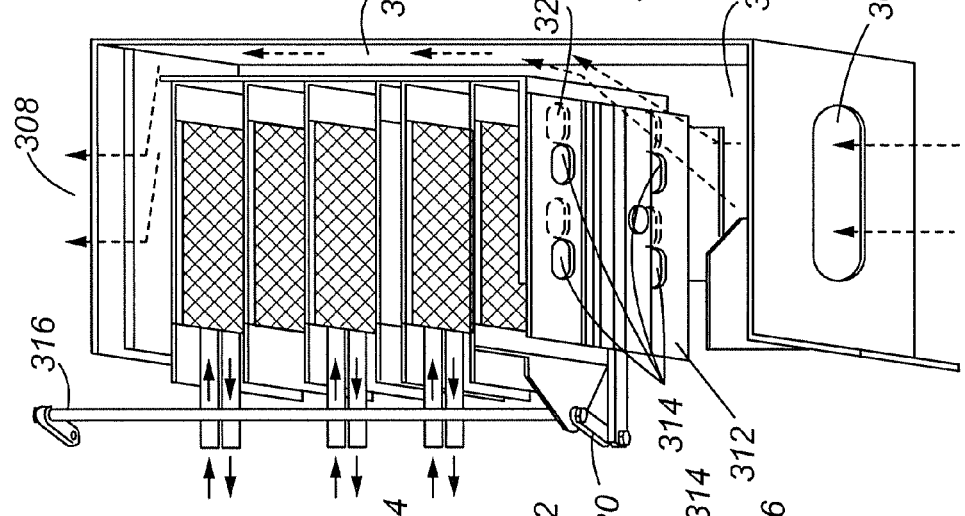
FIG. 5 is a perspective view of a heat exchange device in a second configuration in accordance with embodiments of the present invention.

With reference to FIG. 5, a heat exchange device 212 in a zero heat transfer configuration will be described in accordance with at least some embodiments of the present invention. In the zero heat transfer configuration, substantially all of the exhaust is directed around the heat exchange chambers 224 via the bypass 324. This configuration prevents any substantial heat transfer between the exhaust and the fluid. Rather, the exhaust flows through the heat exchange device 212 via the bypass 324 to the exhaust outlet 308.

The control door 312 is oriented such that the control door exhaust inlets 314 do not overlap with the exchange chamber exhaust inlets 328. The result is that a fluidic barrier is created between the heat exchange chamber 224 and the prechamber 306. In this orientation, the bypass 324 is open to the prechamber 306 and the exhaust is allowed to pass from the prechamber 306 to the exhaust outlet 308 via the bypass 324. Thus, the temperature of fluid entering the heat exchange chamber 224 is substantially equal to the temperature of the fluid exiting the heat exchange chamber 224. Of course, there may be a small amount of heat transfer due to the exhaust heating the side walls separating the bypass 324 and heat transfer chamber 324 but the heating effect on the fluid is negligible.

Figure 6:
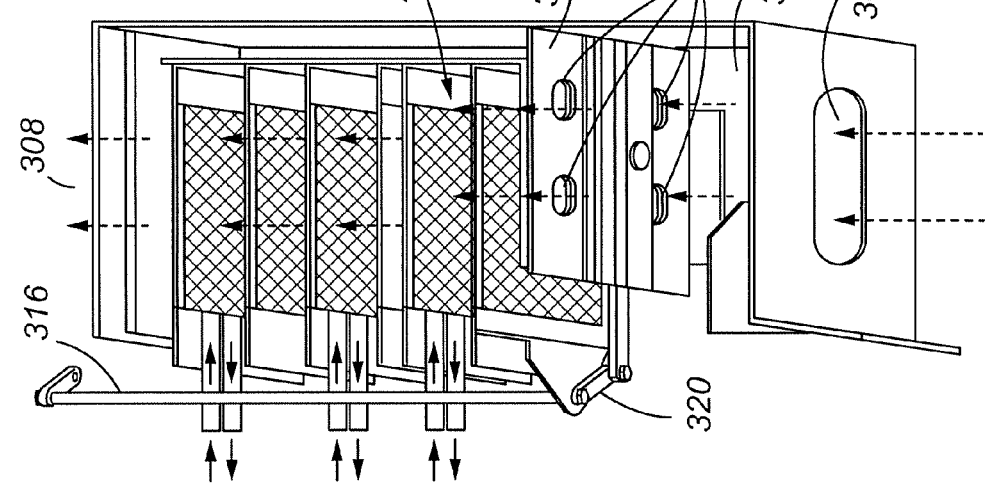
FIG. 6 is a perspective view of a heat exchange device in a third configuration in accordance with embodiments of the present invention.

With reference now to FIG. 6, a heat exchange device 212 in a controlled heat transfer configuration will be described in accordance with at least some embodiments of the present invention. In a controlled heat transfer configuration, a portion of the exhaust is allowed to pass through the passageway of the heat exchange chamber 224 and the other portion of exhaust passes through the bypass 324. In other words, the fractional sum of the portion of exhaust passing through the heat exchange chamber 224 and the portion of exhaust passing through the bypass 324 is equal to about one, with the exception of exhaust leakage.

The amount of exhaust flowing through the passageway of the heat exchange chamber 224 is limited due to the partial overlap of the exhaust inlets 314 and 328. As can be appreciated by one of skill in the art, if more exhaust is desired in the heat exchange chamber 224, then the amount of overlap between exhaust inlets 314 and 328 can be increased. This would also result in a decreased size of the opening to the bypass 324. Alternatively, if less exhaust is desired in the heat exchange chamber 224, then the amount of overlap between exhaust inlets 314 and 328 can be decreased. As the amount of overlap between the exhaust inlets 314 and 328 is decreased, the opening from the prechamber 306 to the bypass 324 is increased. Thus, a larger ratio of the exhaust passes through the bypass 324.

The control door 312 can be positioned in any number of locations, each of which result in a different ratio of exhaust passing through the heat exchange chamber 224 and the bypass 224. Thus, the amount of heat transferred to fluids in the heat exchange chamber 224 can be controlled with a high amount of precision by moving the control door 312 relative to the heat exchange chamber 224 and bypass 324.

Although the present invention has been described in the context of a carpet cleaning system, it can be appreciated by one of skill in the art that embodiments described herein are useful in other applications where a controlled heat transfer is desired. The present invention should not be limited to the use of exhaust in heating a fluid. Rather, any gas or fluid with a relatively high temperature can be used as the medium for transferring heat to a fluid.

The present invention, in various embodiments, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, includes provided devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A heat exchange device for heating at least one fluid to an elevated temperature for use during cleaning, comprising:
   at least one heat exchange chamber having a fluid inlet, a fluid outlet, and an exhaust passage, wherein the at least one heat exchange chamber comprises a first heat exchange chamber and a second heat exchange chamber, wherein the first heat exchange chamber comprises a first fluid inlet, a first fluid outlet, and a first exhaust passage, wherein the second heat exchange chamber comprises a second fluid inlet, a second fluid outlet, and a second exhaust passage, and wherein the exhaust flow control mechanism differentially diverts the exhaust flow between the first exhaust passage and the exhaust bypass at a first ratio and differentially diverts the exhaust flow between the second exhaust passage and the exhaust bypass at a second ratio;
   an exhaust bypass; and
   an exhaust flow control mechanism for differentially diverting an exhaust flow between the exhaust passage and the exhaust bypass.

2. The device of claim 1, wherein a majority of the exhaust flow is directed through the exhaust passage when the control mechanism is in a first position, a majority of the exhaust flow is directed through the exhaust bypass when the control mechanism is in a second position, and fractional portions of the exhaust flow are directed through the exhaust passage and exhaust bypass when the control mechanism is in a third position.

3. The device of claim 2, wherein a sum of the fractional portion of the exhaust flow directed through the exhaust passage and the fractional portion of the exhaust flow directed through the exhaust bypass is substantially equal to one.

4. The device of claim 1, wherein the first and second ratios are different.

5. The device of claim 1, wherein the exhaust flow control mechanism comprises at least one exhaust inlet that is movable relative to a corresponding at least one exhaust inlet of the exhaust passage.

6. The device of claim 5, wherein at least a portion of the exhaust flow is directed through the exhaust passage when the exhaust inlets of the exhaust flow control mechanism and exhaust passage are at least partially aligned.

7. The device of claim 5, wherein the exhaust flow is denied entry to the exhaust passage when the exhaust inlets of the exhaust flow control mechanism and exhaust passage are not aligned.

8. The device of claim 1, further comprising an interface for controlling a position of the flow control mechanism.

9. The device of claim 1, further comprising a prechamber for mixing a flow of at least two exhaust sources to create the exhaust flow that is differentially diverted by the flow control mechanism.

10. A cleaning system, comprising:
a cleaning member which applies at least one fluid to a surface to be cleaned, wherein the at least one fluid comprises a first fluid and a second fluid that have been differentially heated to different temperatures;
at least one heat exchange chamber having a fluid inlet, a fluid outlet, and an exhaust passage between the fluid inlet and outlet, wherein the at least one heat exchange chamber comprises a first heat exchange chamber and a second heat exchange chamber, wherein the first fluid is heated to a first amount in the first heat exchange chamber and wherein the second fluid is heated to a second amount in the second heat exchange chamber;
an exhaust bypass; and
means for differentially diverting an exhaust flow between the exhaust passage and the exhaust bypass; and
means for supplying the heated at least one fluid from a heating machine to the cleaning member.

11. The system of claim 10, wherein a majority of the exhaust flow is directed through the exhaust passage when the means for differentially diverting is in a first position, a majority of the exhaust flow is directed through the exhaust bypass when the means for differentially diverting is in a second position, and fractional portions of the exhaust flow are directed through the exhaust passage and exhaust bypass when the means for differentially diverting is in a third position.

12. The system of claim 10, wherein the means for differentially diverting comprises:
at least one flow control door having at least one exhaust inlet;
at least one exhaust inlet positioned on the exhaust passage; and
a controller for adjusting the relative position of the at least one exhaust inlets of the at least one flow control door and exhaust passage.

13. A heat exchanger, comprising:
an enclosure having an inlet to allow exhaust gas to enter the enclosure, an outlet to allow exhaust gas to exit the enclosure, and an exhaust bypass;
at least one control door with at least one aperture movably positioned within the enclosure;
at least one heat exchange member having a fluid inlet and outlet positioned within the enclosure; and
wherein exhaust gas may flow through the at least one aperture to the at least one heat exchange member when the control door is in a first position and through the exhaust bypass when the control door is in a second position, and wherein the heat exchange member further comprises at least one aperture and wherein the at least one aperture of the control door is movable relative to the at least one aperture of the heat exchange member.

14. The exchanger of claim 13, wherein a majority of the exhaust gas flows to the at least one heat exchange member when the control door is in the first position, a majority of exhaust gas flows through the bypass when the control door is in the second position, and fractional portions of the exhaust gas are directed to the at least one heat exchange member and through the bypass when the control door is in a third position.

15. The exchanger of claim 14, wherein a sum of the fractional portion of the exhaust gas directed to the at least one heat exchange member and the fractional portion of the exhaust gas directed through the exhaust bypass is substantially equal to one.

16. The exchanger of claim 13, wherein the exhaust gas is denied access to the heat exchange member when the apertures of the control door and at least one heat exchange member are not substantially aligned.

17. The exchanger of claim 13, further comprising an interface for controlling a position of the at least one control door.

18. The exchanger of claim 17, wherein the interface comprises at least one of a mechanical, electrical, and electromechanical interface.

* * * * *